Patented Mar. 11, 1941

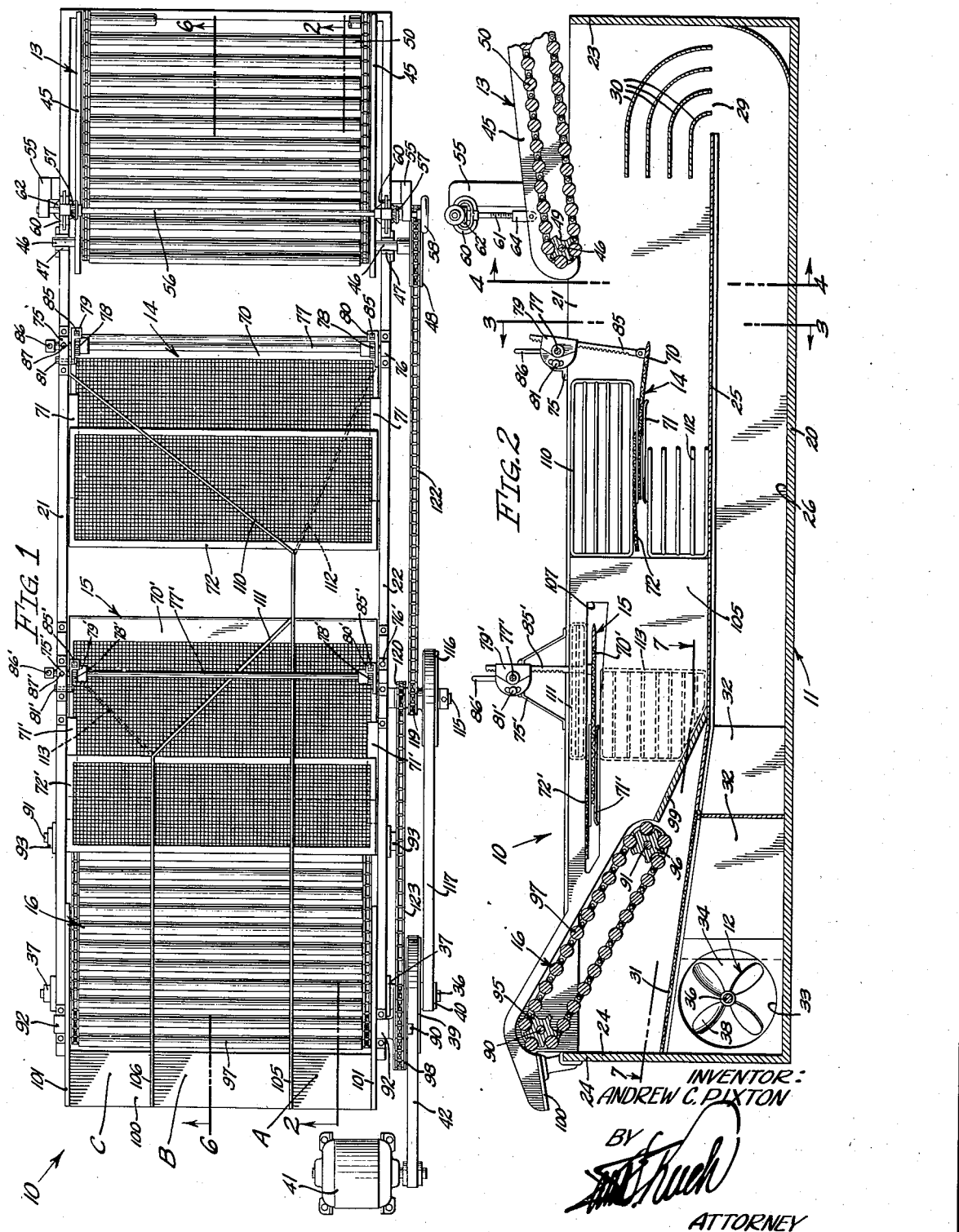

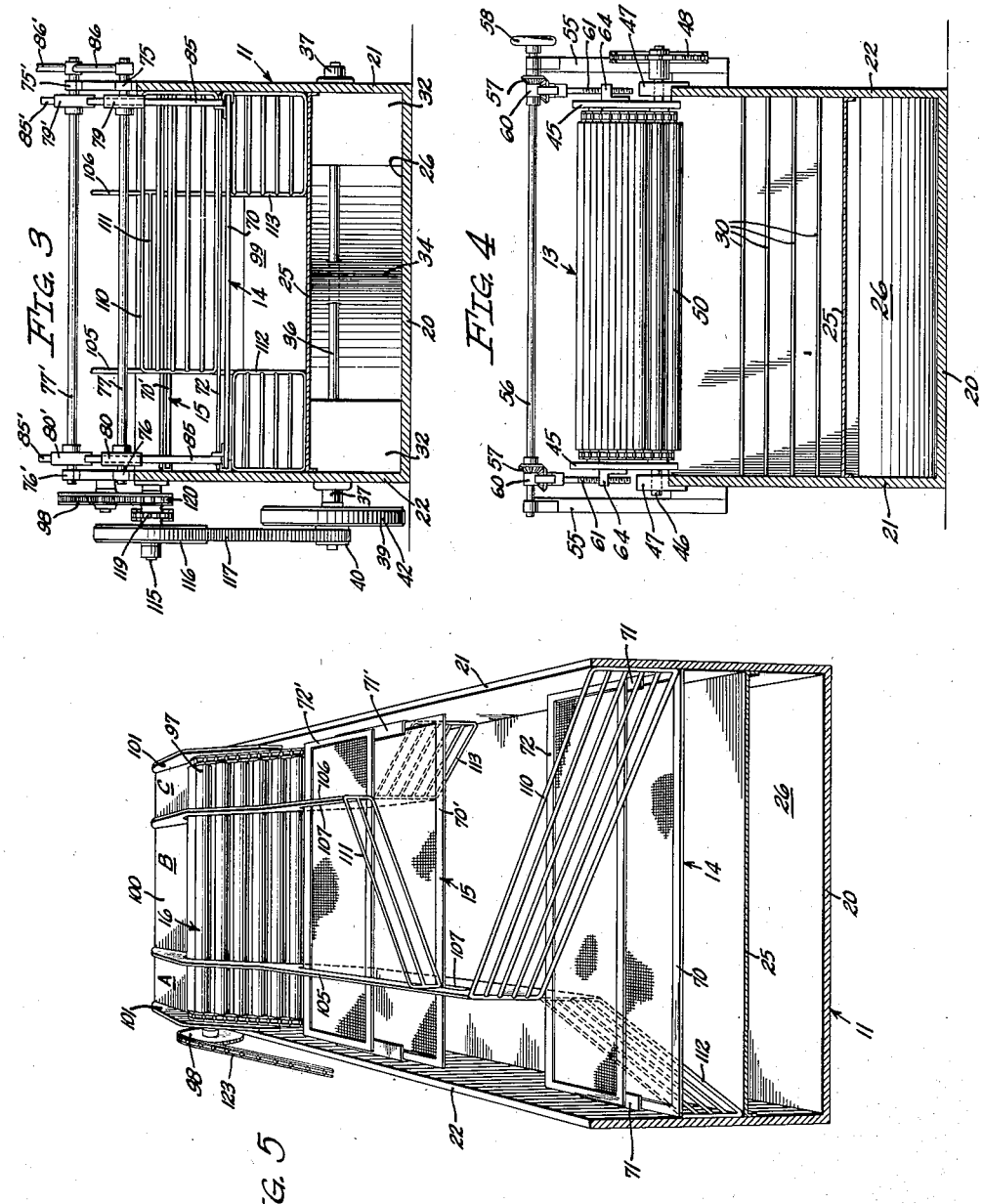

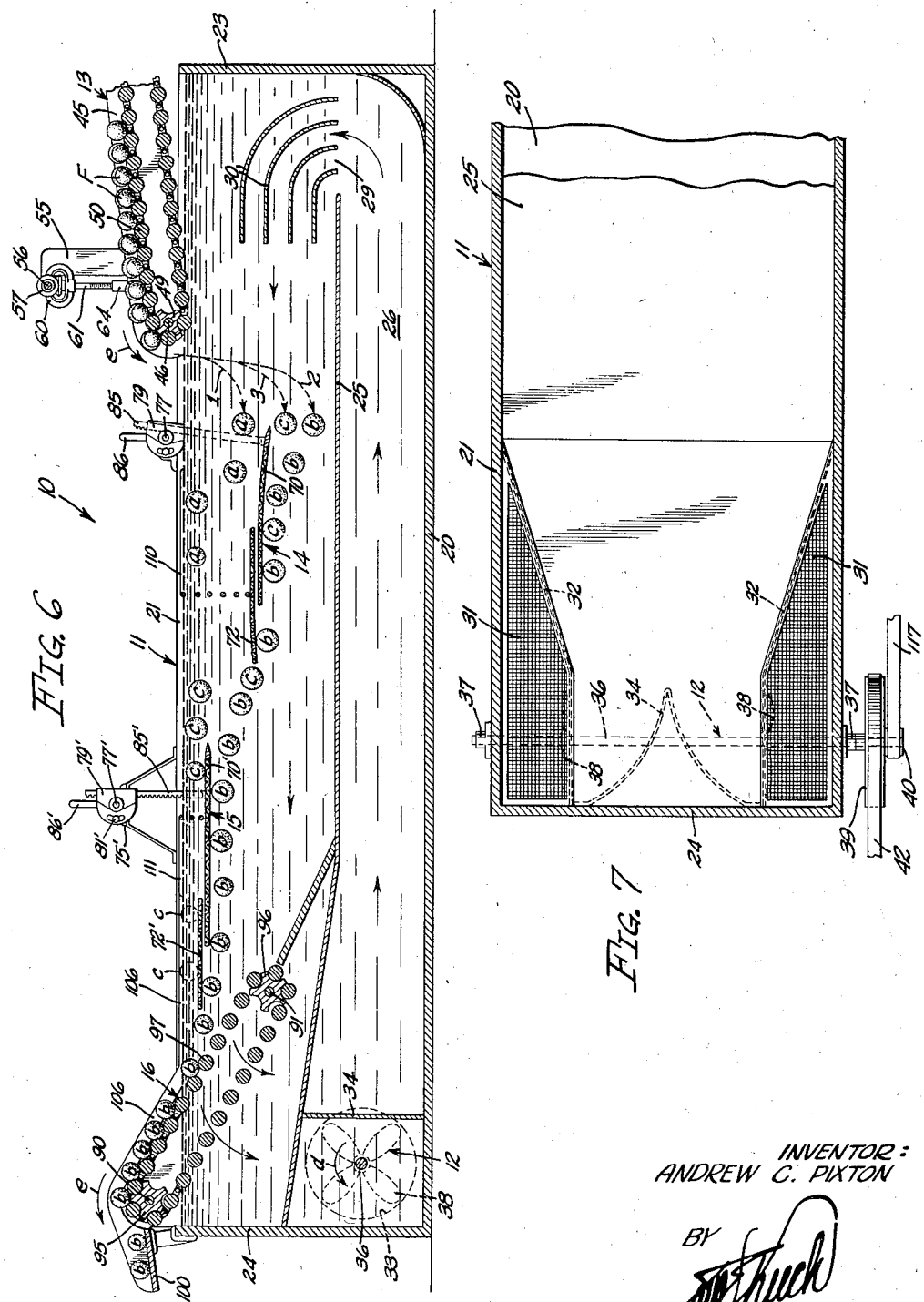

2,234,502

UNITED STATES PATENT OFFICE 2,234,502

METHOD OF AND APPARATUS FOR SEPARATING FROSTED FRUIT

Andrew C. Pixton, Orange, Calif., assignor to Food Machinery Corporation, San Jose, Calif., a corporation of Delaware Application March 6, 1939, Serial No. 260,101

2 Claims. (Cl. 209—173)

This invention relates to a method of and apparatus for separating bodies as to relative density and is particularly useful in the citrus fruit packing industry for separating sound fruit bodies from those more or less damaged by frost.

In the citrus industry, a commonly used apparatus for separating such fruit comprises a tank filled with liquid and having a horizontal separating wall fixed in the tank below the surface of the liquid. Pumping means is provided to cause the liquid to flow in a continuous stream past the separating wall, the fruit to be separated being delivered to the tank by either of the following of two methods: (1) dropping the fruit into the flowing liquid in advance of the separating wall, or (2) submerging the fruit in the liquid and releasing it in advance of the separating wall.

In the first of these methods, the velocity of the fruit dropped into the liquid and the force exerted on the fruit bodies by the flow of the liquid causes the fruit to move downward into the liquid and be carried toward the separating wall by the flow of the liquid, the sound fruit falling to a greater depth due to its greater density in relation to the damaged fruit which has a lower relative density. The separating wall of such apparatus is positioned to separate the fruit in accordance with the depth to which the fruit has descended by the time it reaches the leading edge of the wall, the latter being adjusted so that in theory the damaged fruit passes above the wall while the second, heavier bodies pass therebeneath.

In the second of the two methods mentioned above, all of the fruit is delivered to the tank and is carried to the bottom thereof by a suitable conveyor and released in advance of the separating wall. The buoyant force of the liquid combined with the force exerted by the flow of the liquid causes the fruit bodies to rise upward and toward the forward edge of the separating wall. In theory, the lighter, damaged fruit rises faster and passes above the separating wall while the heavier fruit passes below the wall and is thereby separated from the damaged fruit.

Although two methods described above appear theoretically sound, conditions exist in actual practice which render either of the two methods more or less inaccurate and unreliable. In both of these methods as well as in the present invention, fruit is fed to the apparatus at a rate of three or four boxes per minute in successive rows approximately four feet in length and when a row of fruit is dropped (as in method 1) or released (as in method 2) in the liquid, the bodies often interfere with each other thus preventing normal movement of the bodies in the liquid which results in a certain amount of fruit being carried to the wrong side of the separating wall. Also, the method of dropping fruit into the liquid causes a turbulence in the medium which tends to further interfere with the normal movement of the fruit, thus causing additional inaccuracies in the separation of the fruit bodies.

The regulations relating to shipping damaged fruit are very strict and rigidly enforced, and the separation of damaged from sound fruit must be done with great care. Sometimes as little as five per cent of the fruit shipped is allowed to be even slightly damaged. When either of the two methods above mentioned are employed, it is common practice to discard the damaged fruit and re-examine the sound and slightly damaged fruit discharged from the separating apparatus to segregate the damaged pieces that pass through with the solid fruit as a result of the inaccuracies mentioned. The re-examination of fruit taken from the separator is usually done by means of fluoroscopes, this being a relatively slow and costly process.

Much of the fruit in a frost damaged lot is only partially or very slightly damaged and the relative density of a slightly damaged fruit body differs so little from the density of sound fruit that even fairly accurate separation of the fruit requires a carefully designed and finely adjusted apparatus to eliminate as much inaccuracy as possible.

It is an object of this invention to provide such an apparatus in which the severely damaged fruit is first separated from the mass of fruit to enable a more accurate subsequent separation to be made on the remaining fruit.

Another object is the provision of an apparatus for separating sound fruit as well as that which is severely damaged from fruit the quality of which is doubtful so as to reduce the volume of fruit to be re-examined after passing through the separating apparatus.

Other objects and advantages of this invention will be made manifest in the following description, taken in connection with the accompanying drawings, in which:

Fig. 1 is a plan view of a preferred embodiment of fruit separating apparatus of my invention.

Fig. 2 is a vertical, longitudinal sectional view taken on the line 2—2 of Fig. 1.

Figs. 3 and 4 are transverse sectional views taken on the lines 3—3 and 4—4 respectively, of Fig. 2.

Fig. 5 is a diagrammatical perspective view showing the passageways through which the different qualities of fruit are caused to travel through the apparatus of this invention and by means of which these grades of fruit are segregated.

Fig. 6 is a longitudinal sectional view taken on the line 6—6 of Fig. 1 and showing the manner in which the apparatus operates.

Fig. 7 is a fragmentary, horizontal sectional view taken on the line 7—7 of Fig. 2.

Referring specifically to the drawings, a preferred embodiment of fruit separating apparatus 10 of my invention is shown in Figs. 1 and 2. The apparatus 10 includes a tank 11, liquid circulating apparatus 12, fruit delivery conveyor 13, primary fruit separating member 14, secondary fruit separating member 15 and a discharge elevator 16.

The tank 11 includes a bottom 20, side walls 21 and 22, and end walls 23 and 24. Supported in the tank 11 by the side walls 21 and 22 is a false bottom 25 forming a passageway 26 therebeneath. The false bottom 25 terminates a short of the end wall 23 to provide an opening 29 shown in Fig. 2 and supported by the side walls 21 and 22 above the opening 29 are deflecting fins 30. As shown in Fig. 7, screen panels 31 are mounted on the false bottom 25 to permit circulation of liquid in the tank 11 as hereinafter described. Positioned between the false bottom 25 and the tank bottom 20 as shown in Figs. 2 and 7 are vertical walls 32 having aligned circular openings 33 formed therethrough and fixed between the walls 32 is a deflecting wall 34 shown in Figs. 6 and 7.

The liquid circulating apparatus 12 includes a horizontal propeller shaft 36 shown in Fig. 7, the shaft 36 being journalled in bearings 37 mounted on the tank side walls 21 and 22. Fixed on the shaft 36 are propellers 38 positioned within the openings 33 of the walls 32. Fixed on one end of the shaft 36 is a large and a small pulley 39 and 40 respectively. As shown in Fig. 1, the shaft 36 is rotated by an electric motor 41 through a belt 42 trained about the large pulley 39.

The delivery conveyor 13 includes a pair of side rails 45 shown in Fig. 1 in which a transverse shaft 46 is journalled, the latter being movable vertically in yokes 47 fixed on the tank side walls 21 and 22. Mounted on the shaft 46 as seen in Figs. 1 and 4 is a driven sprocket 48 and fixed on the shaft 46 between the side rails 45 as shown in Fig. 2 is a spider 49 about which an endless roller conveyor 50 is trained. The opposite end of the delivery conveyor 13 is pivoted on a suitable fulcrum (not shown) to permit vertical movement of the discharge end thereof.

Mounted on the side walls 21 and 22 adjacent the delivery conveyor 13 are brackets 55 adapted to rotatably support a shaft 56 upon which bevel gears 57 and a hand wheel 58 are fixed. Provided on the shaft 56 adjacent the bevel gears 57 are hangers 60 in which screws 61 are rotatably mounted, the latter having bevel gears 62 fixed on upper ends thereof. The gears 62 mesh with the gears 57 to transmit rotation of the shaft 56 to the screws 61, lower ends of the latter being threadedly received by ears 64 fixed on the side rails 45 of the delivery conveyor 13.

As shown in Figs. 1 and 2, the primary fruit separating member 14 includes an adjustable screen panel 70 slidable horizontally in channels 71 fixed on the tank side walls 21 and 22. Supported on top of the channels 71 is a stationary screen panel 72. Journalled in bearings 75 and 76 on the side walls 21 and 22, above the primary separating member 14, is a shaft 77 having a pair of gears 78 fixed thereon. Rotatable on the shaft 77 adjacent the gears 78 are rack guides 79 and 80, the guide 79 being held against rotation by a bolt 81 extending through the bearing 75 as seen in Fig. 1. Pivotally mounted at their lower extremities on the panel 70 are racks 85, these being slidable in the guides 79 and 80 and meshing with the gears 78 on the shaft 77. The shaft 77 is rotated by a handle 86 and adapted to be locked against rotation by a set screw 87 provided on the bearing 75 as seen in Fig. 1.

The secondary separating member 15 which is substantially similar to the primary separating member 14 is positioned in tandem relation to, and above the level of, the primary member 14, similar reference numerals with primes added being used to indicate the parts of the secondary member 15.

The discharge elevator 16 includes a driven shaft 90 and an idle shaft 91, these being journalled as shown in Fig. 1 in bearings 92 and 93 respectively mounted on the side walls 21 and 22. Fixed on the shafts 90 and 91 are spiders 95 and 96 respectively about which an endless roller conveyor 97 is trained, and fixed on one end of the shaft 90 is a sprocket 98. Mounted adjacent the lower end of the discharge elevator 16 is a wall 99 which extends between and is supported by the tank side walls 21 and 22 and mounted on the end wall 24 of the tank 11 is a drop board 100.

Mounted vertically in the tank 11, as shown in Figs. 1 and 5, is a pair of partitions 105 and 106 formed to provide horizontal openings 107 as shown in Fig. 5, through which the secondary separating member 15 extends. As seen in Figs. 1, 2 and 5, the partitions 105 and 106 extend over the top of the discharge elevator 16 and are attached to the drop board 100. The partitions 105 and 106 divide the tank 11 into three fruit passageways A, B and C. As seen in Figs. 1 and 5, a grate 110 extends diagonally from the tank side wall 21 to one end of the partition 105, this grate being positioned above the primary fruit separating member 14 and serving to guide cull fruit which passes above the member 14 into the passageway A. Positioned above the secondary separating member 14 is a grate 111 which extends diagonally between the partitions 105 and 106 for the purpose of guiding the questionable fruit which passes above the secondary separating member 15 into the passageway C. Below the primary separating member 14 is a grate 112 extending diagonally from the tank side wall 22 to the partition 105, a similar grate 113 being positioned below the secondary separating member 115 and extending from the tank side wall 21 to the end of the partition 106. The grates 112 and 113 serve to guide the sound fruit which passes below both of the separating members 14 and 15 into the center fruit passageway B.

For the purpose of transmitting power from the driven shaft 36 to the delivery conveyor 13 and discharge elevator 16 a stud 115, shown in Fig. 1, is fixed on the side wall 22 of the tank 11. Rotatable on the stud 115 is a pulley 116 driven from the pulley 40 of shaft 36 by a belt 117. Adjacent to the pulley 116 and rotatable therewith, are sprockets 119 and 120. The sprocket 119 is aligned with the sprocket 48 of the delivery conveyor, the latter being driven by a chain 122, and trained about the sprocket 120 and the sprocket 98 of the discharge elevator 16 is a chain 123.

*Operation*

The tank 11 is filled with water during operation of the apparatus 10 as shown in Fig. 6 and the shaft 36 is driven by the motor 41 in the direction indicated by the arrow *d* in Fig. 6, the propellers 38 thereon forcing water against the deflecting wall 34 which directs the flow rightward as viewed in Fig. 6 through the passageway 26. The flow passes upward through the opening 29 in the false bottom 25 and is directed leftward by the arcuate fins 30, the flow returning to the propellers 38 through the screen panels 31 shown in Fig. 7.

Rotation of the propeller shaft 36 is transmitted by the belt 117 and chains 122 and 123 to the delivery conveyor 13 and discharge elevator 16, these being driven in the direction indicated by arrows *e* of Fig. 6.

As shown in Fig. 6, fruit F to be separated by the separator 10 is delivered by the conveyor 13 and dropped, one row at a time, into the water in advance of the primary separating member 14. The severely damaged fruit bodies, classed as culls, are indicated by the letter *a* in Fig. 6, the sound and less damaged fruit bodies being designated by the letters *b* and *c*, respectively. As mentioned before, the relative density of the damaged fruit bodies is less than the density of sound fruit by an amount proportional to the amount of juice lost by the fruit as a result of the fruit having been frozen.

As the rows of fruit are thus dropped into the water of the tank 11, the velocity of the lighter, damaged fruit bodies *a* is overcome by the flow of water sooner than the velocities of the heavier bodies *b* and *c* which sink deeper, the arrows 1, 2 and 3 of Fig. 6 indicating the approximate paths of the bodies *a*, *b* and *c*, respectively. The culls *a* which pass above the panel 70 of the primary separating member 14 are deflected by the grate 110 into the passageway A shown in Fig. 5 and onto the discharge elevator 16. The sound and slightly damaged fruit bodies *b* and *c* respectively, descend deeper and are carried below the panel 70 by the flow of the water. After the bodies *b* and *c* pass from under the primary separating member 14, they rise in response to the buoyant force of the water, the bodies *c* of lesser density passing above the panel 70' of the secondary separating member 15 while the bodies *b* pass therebelow. The grate 111 deflects the bodies *c* into the passageway C while the grates 112 and 113 direct the sound fruit *b* into the passageway B.

Suitable conveying means (not shown) is provided to receive the separated fruit *a*, *b* and *c* discharged onto the drop board 100 by the discharge elevator 16. The culls are discarded, the sound fruit prepared for shipment, and the fruit *c*, of doubtful quality, is subsequently examined by a fluoroscope or other suitable means to separate the fruit damaged beyond a specified allowable amount from that which is passable.

If desirable to vary the depth to which the fruit bodies *a*, *b* and *c* descend in the water after being dropped from the delivery conveyor 13, the delivery end of the latter can be adjusted by rotating the transverse shaft 56 which rotates the screws 61 causing the conveyor 13 to move vertically to the desired position, the depth to which the fruit bodies descend in the water being substantially proportional to the vertical distance from the surface of the water to the discharge end of the delivery conveyor 13.

The relative vertical position of the advance edge of the panel 70 of the primary separating member 14 may be adjusted by loosening the set screw 87 and rotating the shaft 77 by means of the lever 86. Rotation of the shaft 77 raises or lowers the racks 85 attached to the panel 70 which is sufficiently flexible to permit this adjustment. The panel 70 may be adjusted horizontally as well as vertically by loosening the bolt 81 and rotating the rack guide 79 on the shaft 77 until the proper horizontal position of the panel 70 is obtained. The panel 70' of the secondary separating member 15 is adjusted in the same manner as the panel 70 of the primary separating member 14.

The panel 70 of the primary separating member 14 should be adjusted to a sufficiently high level to prevent any of the fruit bodies *b* and *c* from passing above this panel with the culls *a*. If any of the culls *a* should pass under the panel 70 they rise quickly after passing under the separating member 14 so as to pass over the secondary separating member 15 and are detected during the aforementioned fluoroscopic examination of the bodies *c*.

The method of separating the culls by the primary separating member 14 reduces the amount of fruit to be separated by the secondary member 15 which results in a more accurate separation by the secondary member and a reduction in the amount of fruit requiring fluoroscopic examination.

It is thus apparent that the method and apparatus herein disclosed is adapted to separate fruit into groups of sound, damaged and fruit of doubtful quality with a high degree of accuracy so as to greatly reduce the amount of time, labor and expense heretofore required to accomplish the difficult and exacting process of separating frost-damaged fruit.

I claim as my invention:

1. A method of segregating fruit, the pieces of which vary in density, which comprises: discharging said pieces of fruit from a given point, in a uniform manner, into a flowing flotation medium; segregating said fruit into groups by dividing said fruit in accordance with the depth of the individual pieces thereof in said flotation medium after said pieces of fruit have traveled with said medium a predetermined horizontal distance; restraining, after the aforesaid segregation, that fraction of the lowermost of the aforesaid groups which tends to rise above a given level, from rising above said level, so that said fraction in its further travel with said medium forms a layer substantially on said level; releasing said fraction at a given point in its travel with said medium from restraint against rising upwardly; and at a subsequent point in the flow of said medium segregating said fraction into groups in accordance with the distance which the individual pieces of fruit in said fraction have risen in said medium following the aforesaid release of said fraction.

2. In an apparatus for separating fruit bodies as to the relative density thereof, the combination of: a tank containing a liquid; means for circulating the liquid in said tank to produce a substantially horizontal stream of said liquid adjacent the surface thereof; a primary separating member positioned in said tank and submerged in said stream; means for introducing fruit into said stream in advance of the leading edge of said separating member so that as said fruit is carried along with said stream it is segregated by said member into groups, one of which passes above said member, and one of which passes below said member; and a secondary separting member which is submerged in said stream, the leading edge of said secondary separating member being disposed above the trailing edge of said primary separating member and being spaced a substantial distance horizontally therefrom, so that fruit rising upwardly against said primary member as it travels therebeneath with said stream has the opportunity after passing from under said trailing edge to rise through said stream so that said fruit is again segregated by said secondary member by certain portions of said last mentioned fruit rising in said stream to a point therein above the leading edge of said secondary member before reaching said leading edge.

ANDREW C. PIXTON.